United States Patent
DeRose et al.

(10) Patent No.: US 9,759,862 B1
(45) Date of Patent: Sep. 12, 2017

(54) ADIABATIC/DIABATIC POLARIZATION BEAM SPLITTER

(71) Applicant: Sandia Corporation, Albuquerque, NM (US)

(72) Inventors: Christopher DeRose, Albuquerque, NM (US); Hong Cai, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 15/289,608

(22) Filed: Oct. 10, 2016

(51) Int. Cl.
*G02B 6/00* (2006.01)
*G02B 6/126* (2006.01)
*G02B 6/27* (2006.01)
*G02B 6/125* (2006.01)
*G02B 6/122* (2006.01)

(52) U.S. Cl.
CPC ........... *G02B 6/126* (2013.01); *G02B 6/125* (2013.01); *G02B 6/1228* (2013.01); *G02B 6/2726* (2013.01); *G02B 6/2773* (2013.01)

(58) Field of Classification Search
CPC ...... G02B 6/126; G02B 6/1228; G02B 6/125; G02B 6/2726; G02B 6/2773
USPC .......................................................... 385/11
See application file for complete search history.

(56) References Cited

U.S. PATENT DOCUMENTS

| 9,366,818 | B1* | 6/2016 | Lin | G02B 6/126 |
| 2014/0133793 | A1* | 5/2014 | Masaki | G02B 6/126 |
| | | | | 385/1 |

OTHER PUBLICATIONS

Dai, et al., "Compact Polarization Beam Splitter Using an Asymmetrical Mach-Zehnder Interferometer Based on Silicon-On-Insulator Waveguides", In IEEE Photonics Technology Letters, vol. 24, No. 8, Apr. 15, 2012, pp. 673-675.
Derose, et al., "Ultra Compact 45 GHz CMOS Compatible Germanium Waveguide Photodiode With Low Dark Current", In Optics Express, vol. 19, No. 25, Dec. 5, 2011, pp. 24897-24904.
Lentine, et al., "Silicon Photonics Platform for National Security Applications", In 2015 IEEE Aerospace Conference, 2015, pp. 1-8.
Lu, et al., "Wideband Silicon Photonic Polarization Beamsplitter Based on Point-Symmetric Cascaded Broadband couplers", In Optics Express, vol. 23, No. 23, Nov. 16, 2015, pp. 29413-29422.

(Continued)

*Primary Examiner* — Jerry Blevins
(74) *Attorney, Agent, or Firm* — Medley, Behrens & Lewis, LLC (57) ABSTRACT

The various presented herein relate to an on-chip polarization beam splitter (PBS), which is adiabatic for the transverse magnetic (TM) mode and diabatic for the transverse electric (TE) mode. The PBS comprises a through waveguide and a cross waveguide, wherein an electromagnetic beam comprising TE mode and TM mode components is applied to an input port of the through waveguide. The PBS can be utilized to separate the TE mode component from the TM mode component, wherein the TE mode component exits the PBS via an output port of the through waveguide, and the TM mode component exits the PBS via an output port of the cross waveguide. The PBS has a structure that is tolerant to manufacturing variations and exhibits high polarization extinction ratios over a wide bandwidth.

20 Claims, 12 Drawing Sheets

(56) References Cited

OTHER PUBLICATIONS

Ramadan, et al., "Adiabatic Couplers: Design Rules and Optimization", In Journal of Lightwave Technology, vol. 16, No. 2, Feb. 1998, pp. 277-283.
Su, et al., "Four-Port Integrated Polarizing Beam Splitter", In Optics Letters, vol. 39, No. 4, Feb. 15, 2014, pp. 965-968.
Watts, et al., "Adiabatic Thermo-Optic Mach-Zehnder Switch", In Optics Letters, vol. 38, No. 5, Mar. 1, 2013, pp. 733-735.

* cited by examiner

FIG. 8 TM Polarization

FIG. 9 TE Polarization

Fabricate a polarization beam splitter (PBS) comprising a through waveguide and a cross waveguide, wherein the through waveguide and the cross waveguide are fabricated such that the PBS operates as an adiabatic device in TM mode and a diabatic device in TE mode.

1720

A first edge of the through waveguide and a second edge of the cross waveguide are aligned parallel with a gap G located therebetween and the first edge and the second edge have a length DL, further, a first end of the through waveguide has a width W1 and a second end of the through waveguide has a width W2, a third end of the cross waveguide has a width W2 and a fourth end of the cross waveguide has a width W1.

1810
Apply electromagnetic beam comprising TM mode and TE mode components to an input port of a through waveguide located in a polarization beam splitter (PBS), wherein the PBS comprises the through waveguide and a cross waveguide, the through waveguide and the cross waveguide are fabricated such that the PBS operates as an adiabatic device in TM mode and a diabatic device in TE mode.

1820
Detect TM mode at an output port of the through waveguide and TE mode at an output port of the cross waveguide.

FIG. 18

ADIABATIC/DIABATIC POLARIZATION BEAM SPLITTER

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

On-chip polarization beam splitters (PBS) are utilized in optical communications and quantum cryptography. PBS's are utilized to split (separate) an incident beam into two beams having differing properties, e.g., polarizations. However, PBSs, such as various types of silicon photonic PBSs, have issues relating to ease of fabrication and effects thereof on operation of the PBS, operational bandwidth, etc.

SUMMARY

The following is a brief summary of subject matter that is described in greater detail herein. This summary is not intended to be limiting as to the scope of the claims.

Various technologies presented herein relate to a polarization beam splitter (PBS) which operates as an adiabatic device for a transverse magnetic (TM) mode, and operates as a diabatic (non-adiabatic) device for a transverse electric (TE) mode. In an embodiment the PBS can form an on-chip device.

The PBS includes a through waveguide and a cross waveguide, which are aligned parallel or substantially parallel to each other across the PBS. The through waveguide has a width that tapers up (widens) from a first width $W_1$ to a second width $W_2$, wherein $W_1$ is a narrower width than $W_2$. Conversely, the cross waveguide tapers down (narrows) from the width $W_2$ to the width $W_1$. This respective variation in the waveguide width between the through waveguide and the cross waveguide leads to a greater change in effective index and propagation constant for the TE mode relative to the TM mode along the through waveguide (e.g., along a length L defining a crossover region between the through waveguide and the cross waveguide). Accordingly, the TE mode operates in a diabatic manner along the through waveguide, while the TM mode initially propagates in the through waveguide, until adiabatic operation causes the TM mode to subsequently propagate in the cross waveguide, via a crossover region that separates the through waveguide from the cross waveguide.

The PBS has a structure that is tolerant to manufacturing variations while enabling desired operation over the wide spectral bandwidth. Further, the PBS exhibits high polarization extinction ratios (PERs) over a wide spectral bandwidth.

In an embodiment, the PBS device can be fabricated with a single etching process without modification to typical silicon photonics processing that also includes couplers, tunable filters, modulators, switches, and detectors. Further, sensitivity to fabrication errors (e.g., errors in waveguide widths and gap parameters) is improved in comparison with a conventional system.

While the various technologies presented herein relate to a polarization beam splitter (PBS) which operates as an adiabatic device for a transverse magnetic (TM) mode, and operates as a diabatic (non-adiabatic) device for a transverse electric (TE) mode, other modes of configuration and operation are also contemplated herein. For example, a second PBS which operates as a diabatic device for a transverse magnetic (TM) mode, and operates as an adiabatic device for a transverse electric (TE) mode, such that the second PBS operates in an opposite manner to that previously described.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to an on-chip polarization beam splitter (PBS), which is adiabatic for transverse magnetic (TM) mode of electromagnetic radiation and diabatic for the transverse electric (TE) mode of electromagnetic radiation, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

In an embodiment, the PBS can operate as an adiabatic device for TM mode and as a diabatic device (non-adiabatic) for TE mode. The PBS exhibits high polarization extinction ratios (PERs) over a wide spectral bandwidth. The PBS employs a structure that can be fabricated without modification to a standard silicon photonics process (e.g., via a single etching process) which can include fabrication of and/or inclusion of couplers, tunable filters, modulators, switches, detectors, etc. Further, operation of the PBS is sufficiently broad to enable tolerance to errors that may occur during fabrication of the PBS, wherein such fabrication errors can include variation in waveguide width(s), gap width, device length, etc.

Figure 1:
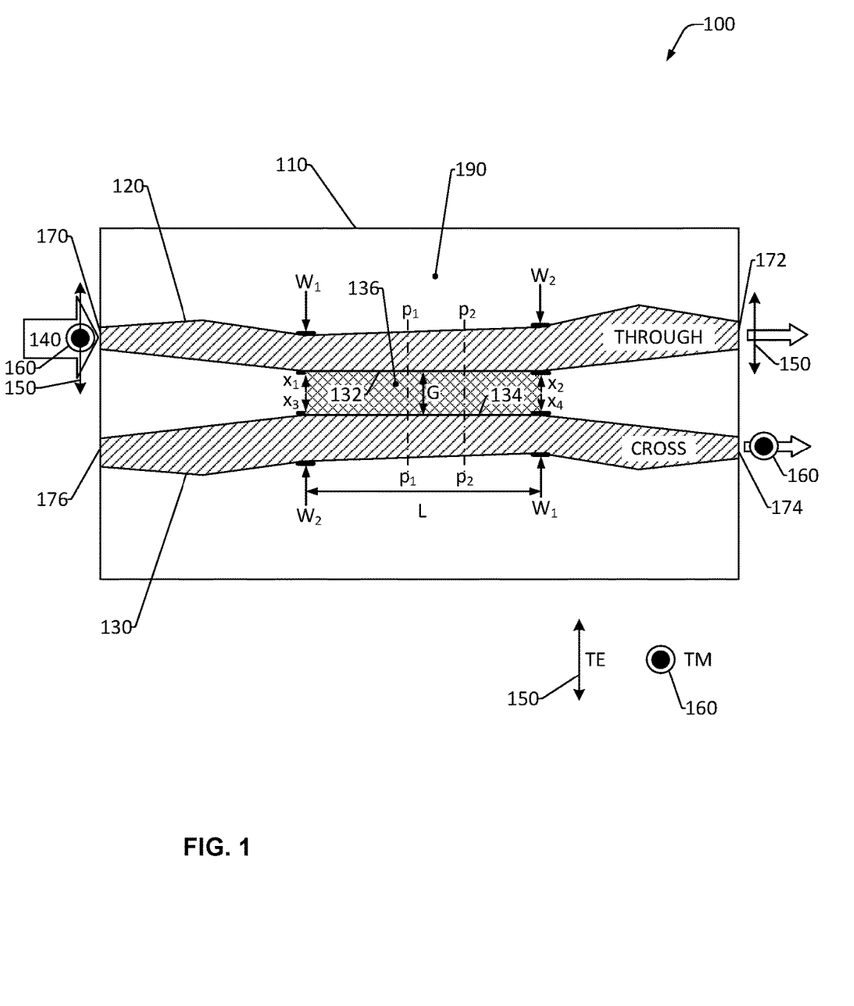
FIG. 1 illustrates a polarization beam splitter (PBS) for adiabatic and diabatic operation, according to an embodiment.

FIG. 1 illustrates a polarization beam splitter (PBS) 100, wherein the PBS 100 is adiabatic for TM mode operation, and diabatic for TE mode operation. The PBS 100 includes a wafer 110, having a through waveguide 120 (first waveguide) and a cross waveguide 130 (second waveguide) fabricated therein.

The respective widths of the two waveguides 120 and 130 vary along a length L, wherein the length L defines a respective portion of the waveguides 120 and 130 over which the beam splitting operation can occur. A first inner edge 132 of the through waveguide 120 is distanced from a second inner edge 134 of the cross waveguide 130 with a constant gap width G within a region defined by length L. The first inner edge 132 between positions $x_1$ and $x_2$ of the through waveguide 120 and the second inner edge 134 between positions $x_3$ and $x_4$ of the cross waveguide 130 are aligned parallel (substantially parallel) to each other. The through waveguide 120 and the cross waveguide 130 are separated by a coupling region 136 (denoted by the crosshatched region of FIG. 1) of the wafer 110 formed between the first inner edge 132 and the second inner edge 134, wherein the coupling region 136 has the length L.

As shown in FIG. 1, the width of the through waveguide 120 tapers up (widens) from $W_1$ (at $x_1$, first end of the through waveguide 120) to $W_2$ (at $x_2$, second end of the through waveguide 120), wherein $W_1$ is a narrower width than $W_2$. Alternatively, the cross waveguide tapers down (narrows) from $W_2$ (at $x_3$, third end of the cross waveguide 130) to $W_1$ (at $x_4$, fourth end of the cross waveguide 130). As shown in FIG. 1, through waveguide 120 and the cross waveguide 130 are aligned substantially parallel, wherein the first end of the through waveguide 120 is located opposite the third end of the cross waveguide 130, and the second end of the through waveguide 120 is located opposite the fourth end of the cross waveguide 130. This respective variation in the waveguide width leads to a greater change in effective index and propagation constant for TE mode relative to the TM mode along the through waveguide 120 (e.g., along length L). In an embodiment, the PBS 100 is diabatic for TM mode, if the propagation constant of the TM mode changes slowly enough along the waveguide length, but adiabatic for TE mode because the device length L is not long enough. With the parameters optimized, the TM mode is smoothly coupled from the through waveguide 120 into the cross waveguide 130, while the TE mode keeps propagating in the input waveguide and goes to the through port without significant attenuation. This operation is represented in FIG. 1 with an optical beam 140 (electromagnetic beam) being input into the through waveguide 120 including a TE mode component 150 (double-ended arrow) and a TM mode component 160 (concentric circles). As shown in FIG. 1, with the optical beam 140 comprising the TE and TM modes being input to an input port 170 of the through waveguide 120, the TE mode component 150 propagates through the through waveguide 120 to an output port 172 of the through waveguide 120. Further, the TM mode component 160 propagates through the through waveguide 120, and couples to the cross waveguide 130 (e.g., via the coupling region 136) to an output port 174 of the cross waveguide 130.

It is to be appreciated that while FIG. 1 illustrates operation of the optical beam 140 (e.g., modes 150 and 160) being applied to the input port 170, operation of the PBS 100 can be in any desired configuration such that the optical beam 140 can be applied to (input) any of the ports, e.g., port 170, port 172, port 174, or port 176 (wherein port 176 is connected to cross waveguide 130). Further, the respective heights of the through waveguide 120 and cross waveguide 130 can be of any desired value to facilitate operation of the various embodiments presented herein, e.g., the waveguide height is selected such that the coupling coefficient for TM polarized waves is much larger than TE polarized waves or vice versa. In an exemplary embodiment, the waveguides 120 and 130 have a height of 230 nm.

In an embodiment, the wafer 110 can be a silicon-on-insulator (SOI), the through waveguide 120 and the cross waveguide 130 are formed from silicon, or silicon-based material, and material comprising an outer region(s) 190 and the coupling region 136 are formed from a dielectric (e.g., silicon dioxide ($SiO_2$). The PBS 100 can be utilized in high refractive index contrast systems utilizing a combination of semiconductor/dielectric waveguide, e.g. $Si/SiO_2$, $SiN/SiO_2$, $InP$, $Ge/SiO_2$.

In an embodiment, a PBS can be configured such that it operates as a diabatic device for a transverse magnetic (TM) mode, and as an adiabatic device for a transverse electric (TE) mode. An exemplary configuration comprises the waveguides 120 and 130 being rotated by 90° along their respective primary axes (e.g., for waveguide 120 along an axis between ports 170 and 172, and for waveguide 130 along an axis between ports 176 and 174) from the positions depicted in FIG. 1. Hence, the effective operating portion of the waveguide would be the thickness of the first waveguide, the thickness of the second waveguide, and the width of the coupling region (e.g., gap G of the coupling region 136) located therebetween, such that the second PBS operates in an opposite manner to that previously described.

Figure 2:
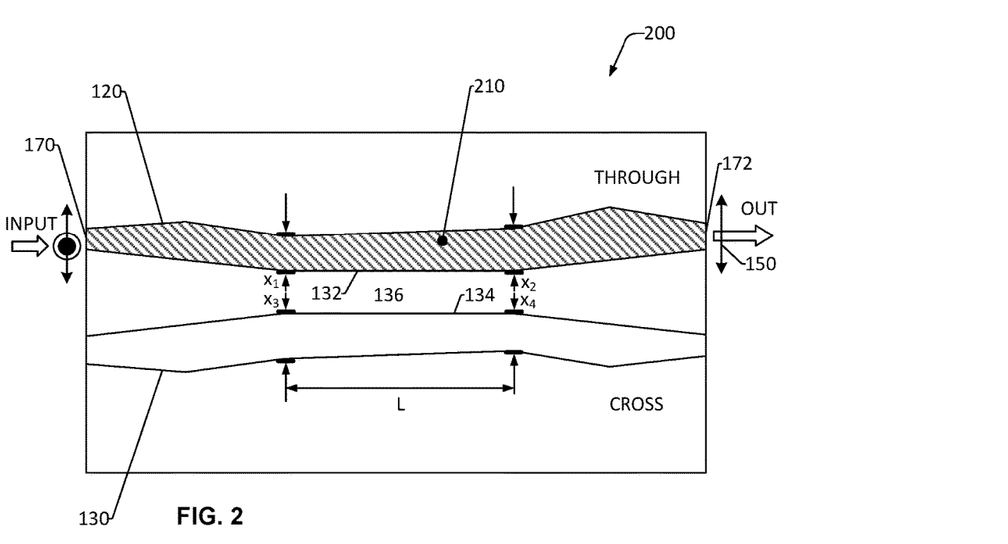
FIG. 2 illustrates a schematic of adiabatic operation of the PBS, according to an embodiment.
Figure 3:
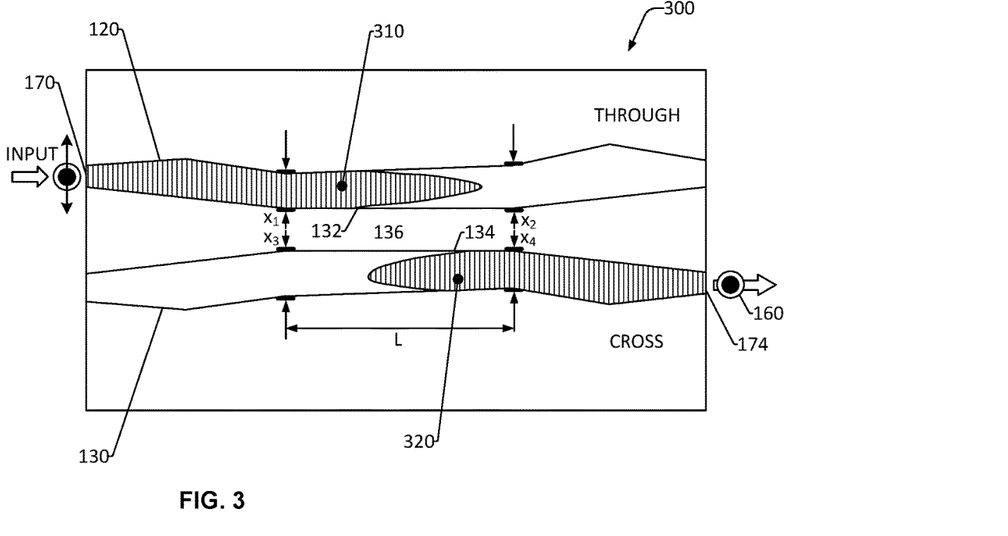
FIG. 3 illustrates a schematic of diabatic operation of the PBS, according to an embodiment.

FIGS. 2 and 3 are schematics 200 and 300 respectively illustrating electric fields for a TM mode operation and a TE mode operation. As shown in FIG. 2, an electric field 210 measured for the TE mode 150 propagates solely along the through waveguide 120 to output at output 172. The TE mode operation is asynchronous, with minimal (if any) power transfer between the through waveguide 120 and the cross waveguide 130. As shown in FIG. 3, the electric field 310 measured for the TM mode 160 initially propagates along a first portion the through waveguide 120 and then, via the coupling region 136, crosses from the through waveguide 120 to a second portion of the cross waveguide 130, to form the electric field 320 that is operating at output port 174. The TM mode operation is synchronous, with power transfer between the through waveguide 120 and the cross waveguide 130.

Figure 4:
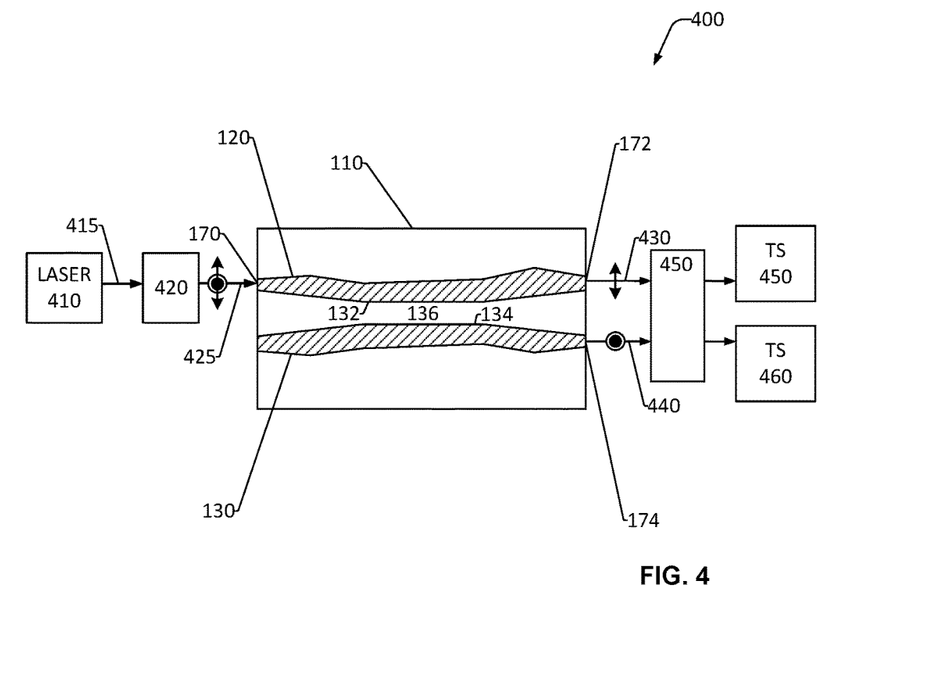
FIG. 4 illustrates a PBS incorporated into a beam splitting system, according to an embodiment.

Turning to FIG. 4, illustrated is a test system 400 configured to transmit a light wave into the input port 170 of the waveguide 120, and measure respective transmission spectra at the output ports 172 and 174. System 400 includes laser 410, e.g., a single mode tunable laser (TLS), configured to generate an optical beam 415 which is input into a polarization synthesizer 420. The polarization synthesizer 420 is configured to simultaneously manipulate polarization of the optical beam 415 input from the laser 410. The polarization synthesizer 420 is further configured to control its output state of polarization by rotating internal half wave and quarter wave plates, such that respective TE and TM polarized optical inputs 150 and 160 are temporally well separated. An optical beam 425 (e.g., optical beam 140) comprising the respective TE and TM polarized optical inputs 150 and 160 is output from the polarization synthesizer 420 into the waveguide 120, wherein the optical beam 425 is coupled from the polarization synthesizer 420 into the PBS 100 using an optical fiber (e.g., a lensed single-mode-fiber (SMF)), the line 425 represents both the beam comprising the TE and TM polarized light, and also the optical fiber. Respective light beams 430 and 440 respectively output from the output port 172 of the through waveguide 120 or the output port 174 of the cross waveguide 130 are collected by identical lensed SMFs and input into a power meter 450. The line 430 represents both the beam comprising the TE polarized light 150 and also the optical fiber coupling the through port 172 to the power meter 450, similarly the line 440 represents both the beam comprising the TM polarized light 160 and also the optical fiber coupling the cross port 174 to the power meter 450.

As the laser 410 sweeps through various wavelengths over a spectral span (e.g., from 1510 nm to 1600 nm), the power meter 450 is configured to generate a transmission spectra 460 for the TE mode light 150, and a transmission spectra 470 for the TS mode light 160.

Figure 5:
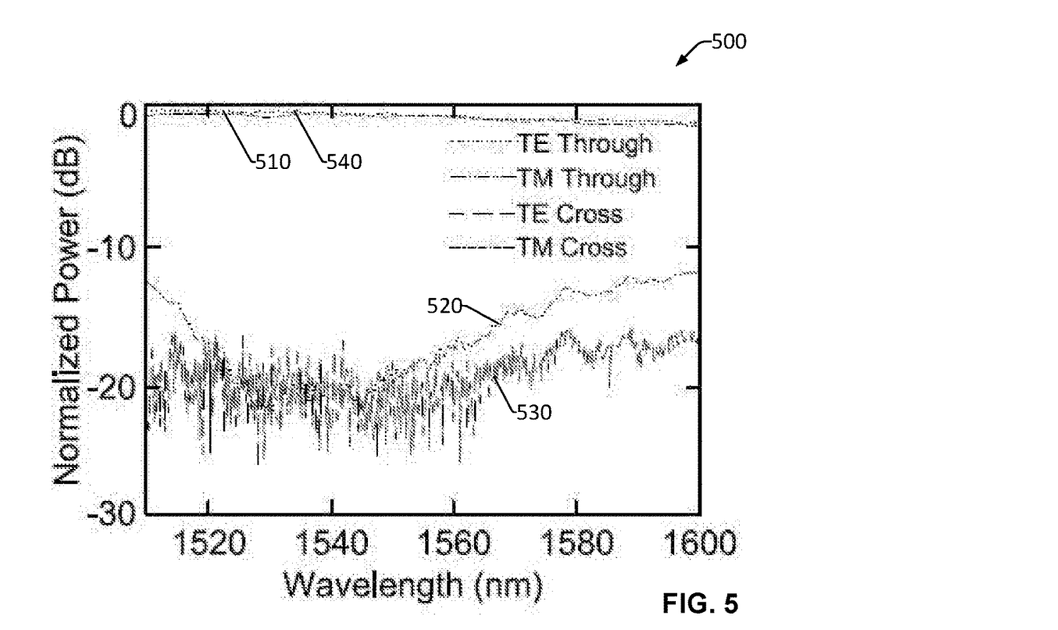
FIG. 5 illustrates a plot of wavelength vs. normalized power (dB) for a conventional PBS.

Turning to FIG. 5, illustrated is a plot 500 showing a transmission spectra measured for a system utilizing a typically available PBS operating with a wavelength range between 1510 to 1600 nm. Plot 510 is TE mode power measured in the through waveguide 120, plot 520 is TM mode power measured in the through waveguide 120, plot 530 is TE mode power measured in the cross waveguide 130, and plot 540 is TM mode power measured in the cross waveguide 130. The transmitted optical power is normalized using a straight waveguide on the same chip. The insertion loss of TE mode from through port and TM mode from the cross port was measured to be lower than ~0.8 dB at the maximum over a 90 nm spectral span.

Figure 6:
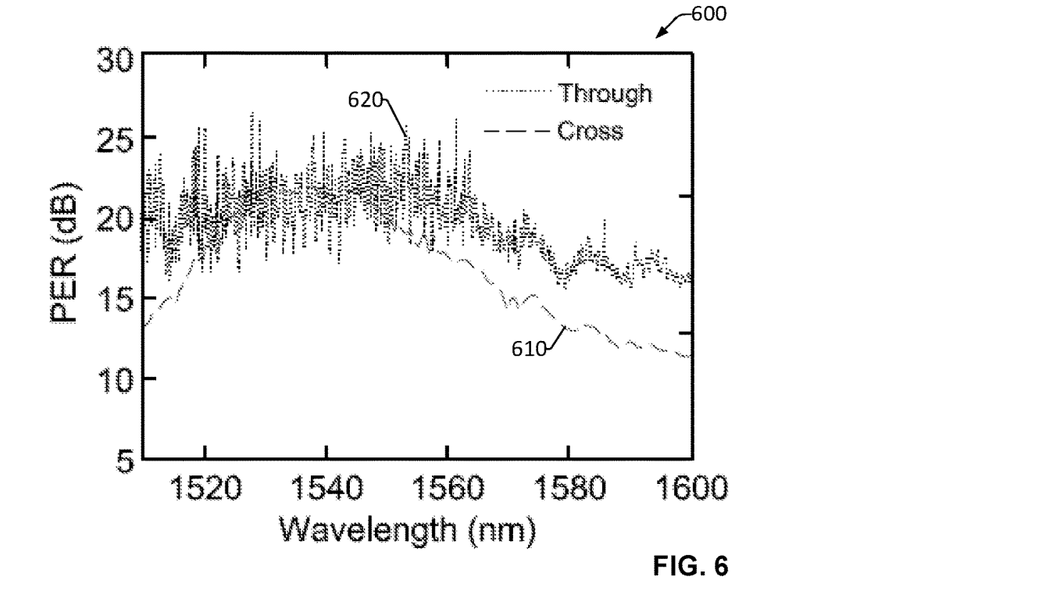
FIG. 6 illustrates a plot of wavelength vs. PER (dB) for a PBS, according to an embodiment.

FIG. 6, plot 600, presents a transmission spectra measured for a system utilizing the PBS 100 (e.g., incorporated into a 230 nm SOI silicon photonics platform). Plot 610 is transmission spectra measured in the through waveguide 120, and plot 620 is transmission spectra measured in the cross waveguide 130. As shown in FIG. 6, when operating with a wavelength range between 1510 nm to 1600 nm, an average polarization excitation ratio (PER) measured at the output port 172 of the through waveguide 120 was 16.9 dB, with a minimum PER measured at the output port 172 of the through waveguide 120 of 11.3 dB (per plot 610), and average PER measured at the output port 174 of the cross waveguide 130 was 19.4 dB, with a minimum PER measured at the output port 174 of the cross waveguide 130 of 15.9 dB (per plot 620). Per the foregoing, in an embodiment, a PBS was fabricated that is adiabatic for TM mode operation and diabatic for TE mode operation.

The PER of the through port is defined, per Eqn. 1, as:

$$PER_{through} = 10\log_{10}\left(\frac{P_{TE,through}}{P_{TM,through}}\right) \qquad \text{Eqn. 1}$$

The PER of the cross port is defined, per Eqn. 2, as:

$$PER_{cross} = 10\log_{10}\left(\frac{P_{TM,cross}}{P_{TE,cross}}\right) \qquad \text{Eqn. 2}$$

Fabrication of the PBS 100 to facilitate adiabatic operation for the TM mode, and diabatic operation for the TE mode can be based upon various design parameters. For example, the respective widths $W_1$, $W_2$, G, and length L (and waveguide height H, not shown) can all be configured to facilitate the desired adiabatic and diabatic operation.

Figure 7:
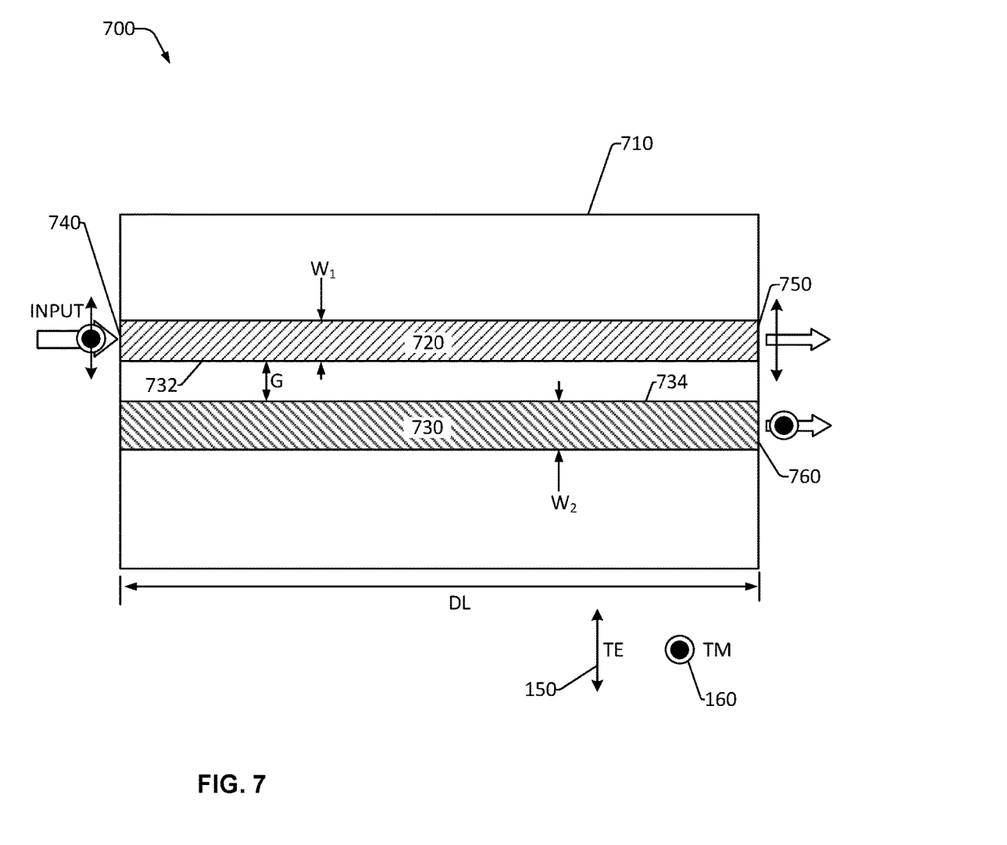
FIG. 7 illustrates a schematic of a portion of a PBS incorporated into a beam splitting system, according to an embodiment.
Figure 8:
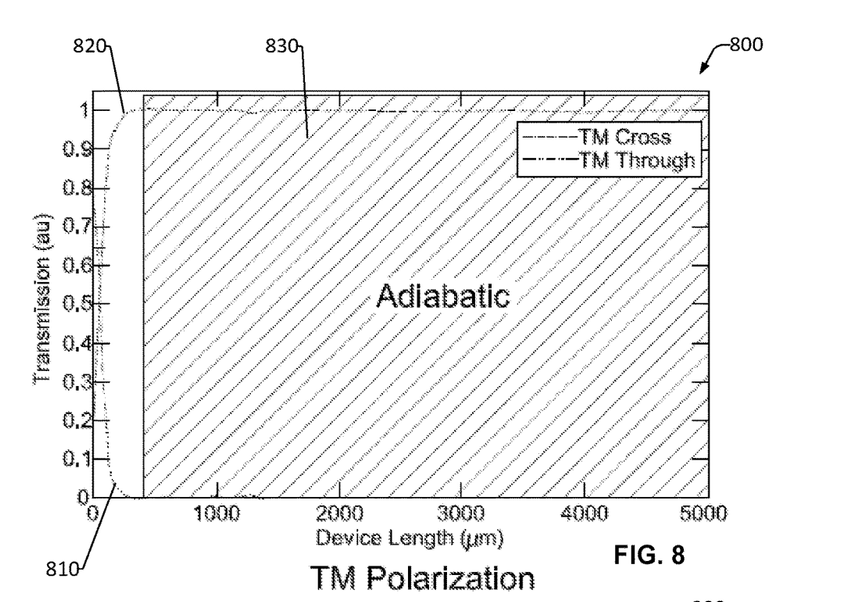
FIG. 8 presents a plot of transmission measures vs. device length for respective through and cross waveguides, according to an embodiment.
Figure 9:
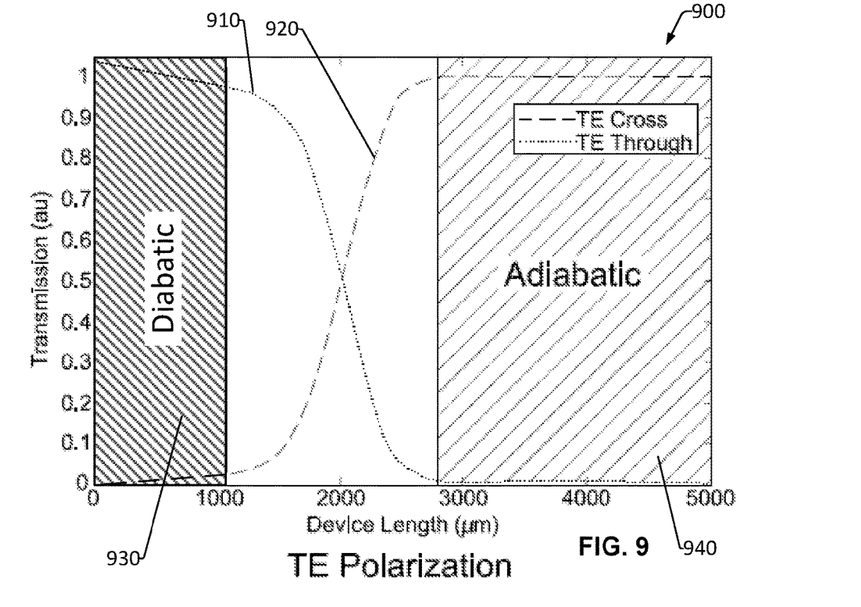
FIG. 9 presents a plot of transmission measures vs. device length for respective through and cross waveguides, according to an embodiment

FIG. 7, schematic 700, illustrates a PBS 710 comprising a first test waveguide 720 having the width $W_1$=0.38 μm, and a second test waveguide 730 having the width $W_2$=0.4, with a crossover gap G=0.8 μm between a first sidewall 732 of the first test waveguide 720 and a second sidewall 734 of the second test waveguide 730. In an embodiment, the first test waveguide 720 can be functioning as a through waveguide and the second test waveguide 730 can be functioning as a cross waveguide, or vice versa. The PBS 710 has a device length DL, wherein DL covers a range of lengths from 1 μm to 5000 μm. As shown, an optical beam 140 is input into an input port 740 of the first test waveguide 720, wherein the optical beam 140 includes a TE mode component 150 and a TM mode component 160. The TE mode component 150 propagates through the length of the first test waveguide 720 to be output at the output port 750, while the TM mode component 160 propagates through a first portion of the first test waveguide 720 (per FIG. 3), crossover occurs resulting in the TM mode component 160 subsequently propagating through a second portion of the second test waveguide 730 to be detected at an output port 760 located on the second test waveguide 730. FIGS. 8 and 9 are respective polarization plots 800 and 900, obtained for the PBS 710. FIG. 8 illustrates polarization measurements in TM mode as respectively measured on the through waveguide 720 and the cross waveguide 730, as a function of transmission (au) and the device length DL. As shown, the TM mode transmission on the through waveguide 720, plot 810, reduces from 0.8 au at an initial DL of approx. 1 μm through to a value of 0 au at 300 μm, wherein the transmission measure of 0 au is maintained for a DL range of 300 μm to 5000 μm. Conversely, as shown, TM mode transmission on the cross waveguide 730, plot 820, increases from 0.2 au at an initial DL of approx. 1 μm through to a value of 1 au at 300 µm, wherein the transmission measure of 1 au is maintained for a DL range of 300 µm to 5000 µm. Accordingly, for any DL in the range of 300 µm to 5000 µm, the operation is adiabatic, region 830.

FIG. 9 illustrates polarization measurements in TE mode as respectively measured on the through waveguide 720 and the cross waveguide 730, as a function of transmission (au) and the device length DL. As shown, the TE mode transmission on the through waveguide 720, plot 910, is 1 au over a DL range of approx. 1 µm to 1000 µm. For a DL of between 1000 µm to 2800 µm, the transmission au reduces from 1 au to 0 au, wherein the transmission remains at 0 au for a DL of between 2800 µm to 5000 µm. Conversely, as shown, the TE mode transmission on the cross waveguide 730, plot 920, is 0 au over a DL range of approx. 1 µm to 1000 µm. For a DL of between 1000 µm to 2800 µm, the transmission au increases from 0 au to 1 au, wherein the transmission remains at 1 au for a DL of between 2800 µm to 5000 µm. Hence, for the exemplary parameter values, as shown, in TE mode, the PBS 710 exhibits diabatic operation for a DL between approx. 1 µm to 1000 µm, region 930, and further exhibits adiabatic operation for a DL between 2800 µm to 5000 µm, region 940.

Figure 10:
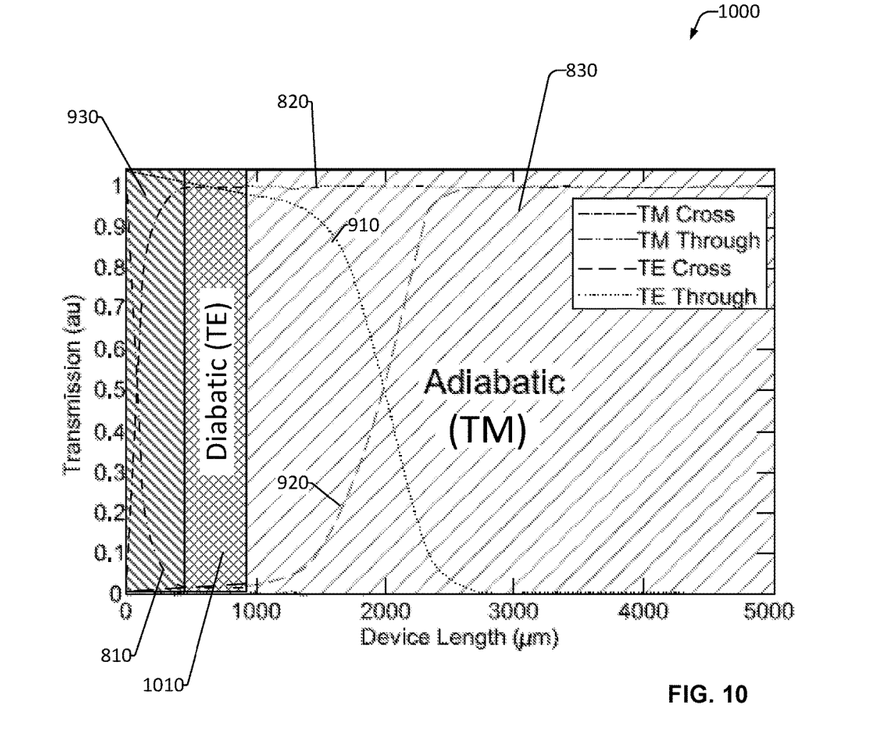
FIG. 10 presents a plot comprising an overlay of the transmission measures illustrated in FIGS. 8 and 9, according to an embodiment.

FIG. 10, illustrates a polarization overlay 1000, wherein respective plots and regions illustrated in FIGS. 8 and 9 are overlaid. As shown, a portion of the TE diabatic region 930 coincides with a portion of the TM adiabatic region 830, as shown by the region 1010, wherein region 1010 has a DL of between 300 µm and 1000 µm. Given the effectively large range for a value of DL wherein adiabatic and diabatic operation can occur, enables a high degree of fabrication error (e.g., etch bias) to be accommodated during manufacture of the through waveguide 120 and cross waveguide 130 while the PBS 710 will still perform as desired.

Accordingly, per the exemplary parameters of $W_1$=0.38 µm, $W_2$=0.4, G=0.8 µm, over a DL range of 300 µm to 1000 µm, the PBS exhibits adiabatic behavior for the transverse magnetic (TM) mode, and diabatic behavior for the transverse electric (TE) mode.

Figure 11A:
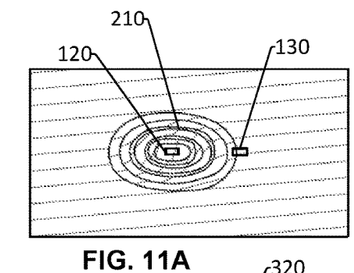
FIGS. 11A-D illustrate energy fields for uncoupled and coupled modes of operation, according to an embodiment.
Figure 11B:
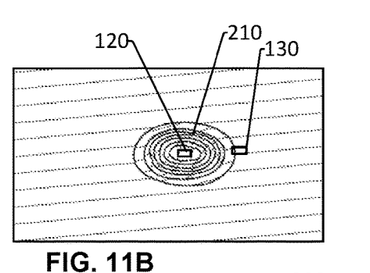
Figure 11C:
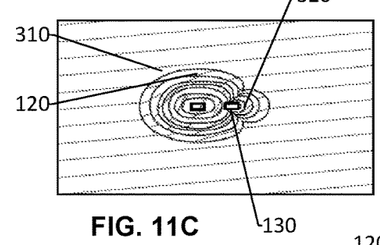
Figure 11D:
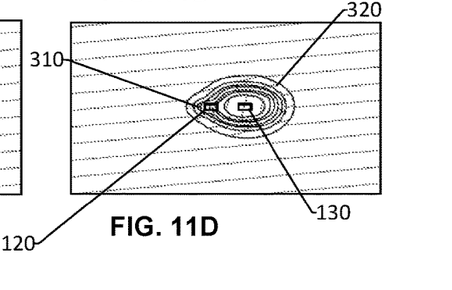

FIGS. 11A-D illustrate electric fields measured at the through waveguide and the cross waveguide during respective modes of operation. The electric fields are respectively measured through $p_1$-$p_1$ and $p_2$-$p_2$ of FIG. 1, wherein for the through waveguide 120 the width of the waveguide is wider at $p_2$ than and for the cross waveguide 130 the width of the waveguide is wider at $p_1$ than $p_2$. As shown in FIGS. 11A and 11B, the electric field 210 measured for the TE mode is the same at positions $p_1$ and $p_2$ of the through waveguide 120, with no TE mode electric field being measured at the cross waveguide 130 at $p_1$ or $p_2$. Conversely, FIGS. 11C and 11D illustrate a first portion 310 of the TM mode electric field being present in the through waveguide 120 with minimal TM mode electric field measured in the cross waveguide 130 at position $p_1$, while at position $p_2$ the TM mode electric field 320 is present in the cross waveguide 130 with minimal TM mode electric field present in the through waveguide 120, indicating that the TM mode has crossed from the through waveguide 120 to the cross waveguide 130. FIGS. 11A and 11B represent uncoupled waveguide operation such that $\beta_1$ and $\beta_2$ can be determined (further described below) and FIGS. 11C and 11D represent supermode operation of the waveguides such that $\beta_{even}$ and $\beta_{odd}$ can be determined (further described below).

$$\beta_{even} - \beta_{odd} = 2S \qquad \text{Eqn. 3}$$

In the foregoing, $\beta_{even}$ is a coefficient of symmetric supermode operation of two waveguides (e.g., waveguides 120 and 130), $\beta_{odd}$ is a coefficient of asymmetric supermode operation of two waveguides (e.g., waveguides 120 and 130), and 2S is a difference of propagation constants of the supermodes is a coupling strength based upon a difference between $\beta_{even}$ and $\beta_{odd}$.

$$\beta_2 - \beta_1 = 2\delta \qquad \text{Eqn. 4}$$

Further, $\beta_2$ is a propagation coefficient of a wide waveguide, while $\beta_1$ is a propagation coefficient of a narrow waveguide.

$$S^2 = \delta^2 + k^2 \qquad \text{Eqn. 5}$$

From Eqns. 3-5, the respective coupling strengths can be derived, where:

$$k_{TM} > k_{TE} \qquad \text{Eqn. 6}$$

$k_{TM}$ is the coupling strength in TM mode operation, $k_{TE}$ is the coupling strength in TM mode operation, wherein the coupling strength in TM mode operation has to be greater (much greater) than the coupling strength in TM mode operation for adiabatic coupling to occur. Hence, per Eqn. 7, length L must be much greater than the coupling strength k:

$$L \gg \frac{\pi}{2k} \qquad \text{Eqn. 7}$$

Figure 12:
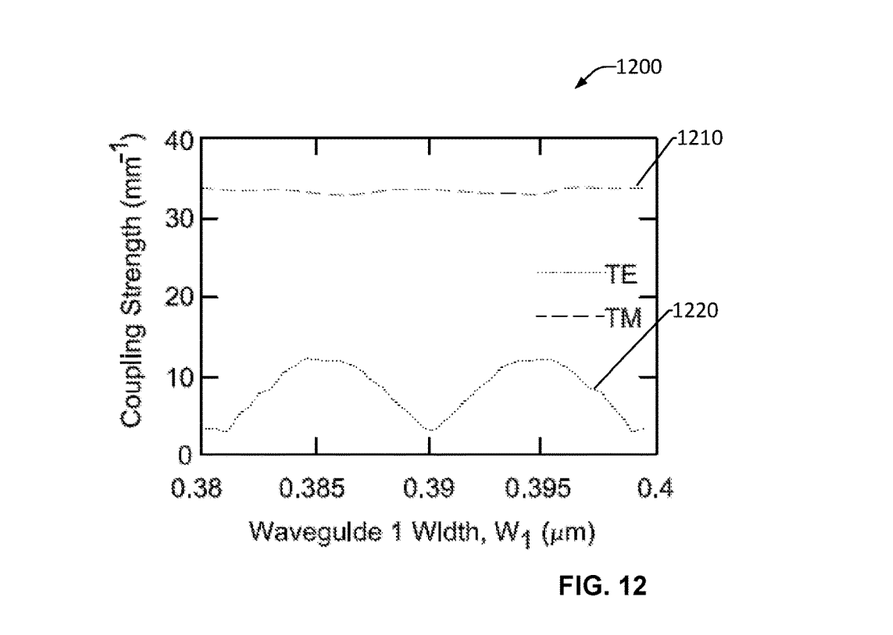
FIG. 12 presents a plot of coupling strength as a function of waveguide width, according to an embodiment.

Per the relationships presented in Eqns. 3-7, for a device to be adiabatic the length L must be much greater than the coupling strength k. For waveguides where the length L is shorter and hence tends towards the coupling strength k then the waveguide will tend to operate in a diabatic manner as the length L decreases. FIG. 12, plot 1200, illustrates a plot 1210 of TM mode and a plot 1220 of TE mode, for coupling strength versus waveguide width $w_1$, wherein waveguide width $w_1 + w_2$=a constant value, and the waveguide gap G is also constant. As shown in FIG. 12, the TM mode 1210 reaches adiabatic condition faster than the TE mode 1220.

Figure 13:
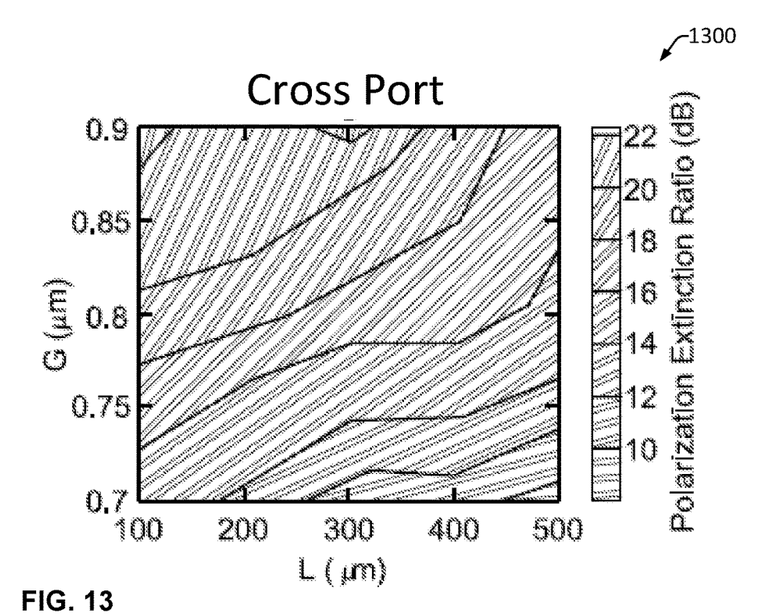
FIG. 13 illustrates PER measured for a cross port incorporated into a PBS, according to an embodiment.
Figure 14:
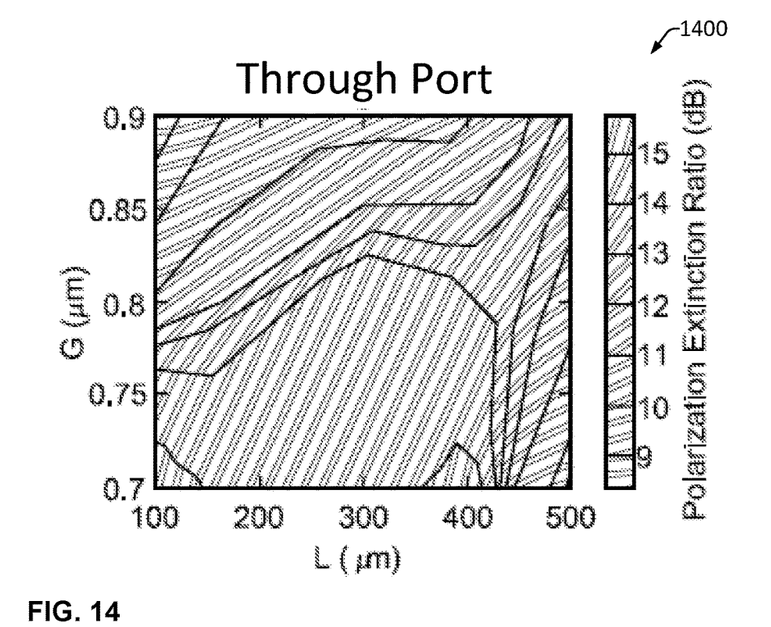
FIG. 14 illustrates PER measured for a through port incorporated into a PBS, according to an embodiment.

FIGS. 13-16 illustrate 2D-contour maps of PER determined for respective gap widths G, device lengths DL, and widths $W_1$ and $W_2$. FIG. 13, contour map 1300, illustrates variation in PER (dB) measured at a cross port (e.g., output 174) for gap widths G over a range of 0.7 to 0.9 µm versus device lengths DL over a range of 100 to 500 µm, where $W_1$=0.38 µm and $W_2$=0.4 µm. FIG. 14, contour map 1400, illustrates variation in PER (dB) measured at a through port (e.g., output 172) for gap widths G over a range of 0.7 to 0.9 µm versus device lengths DL over a range of 100 to 500 µm.

Figure 15:
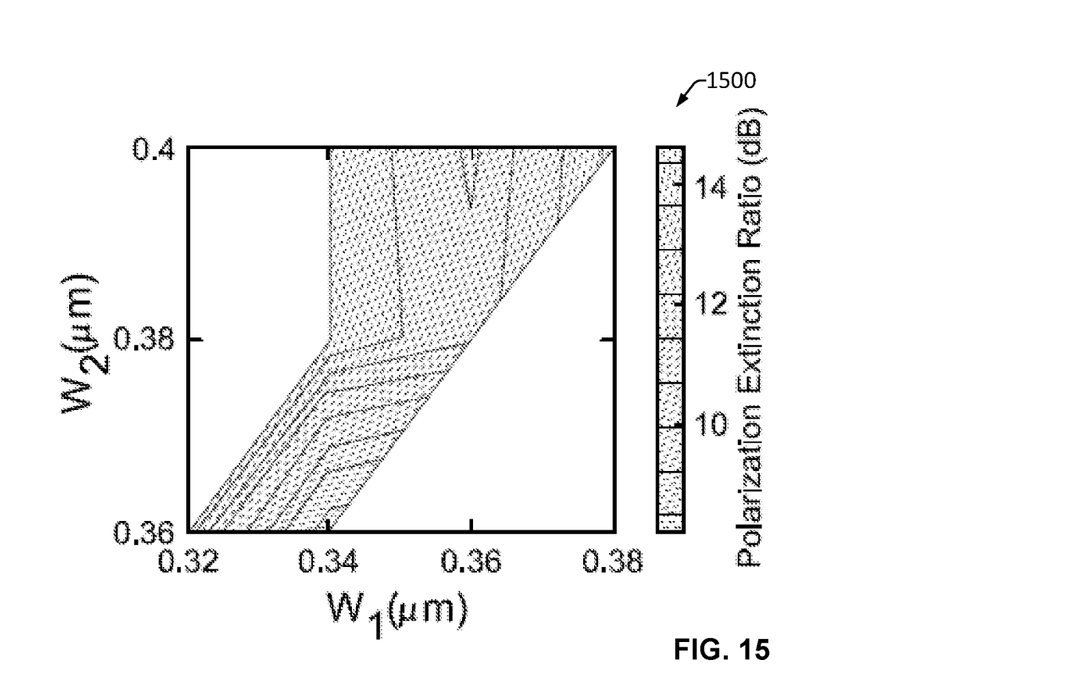
FIG. 15 illustrates PER measured for a through port incorporated into a PBS, according to an embodiment.
Figure 16:
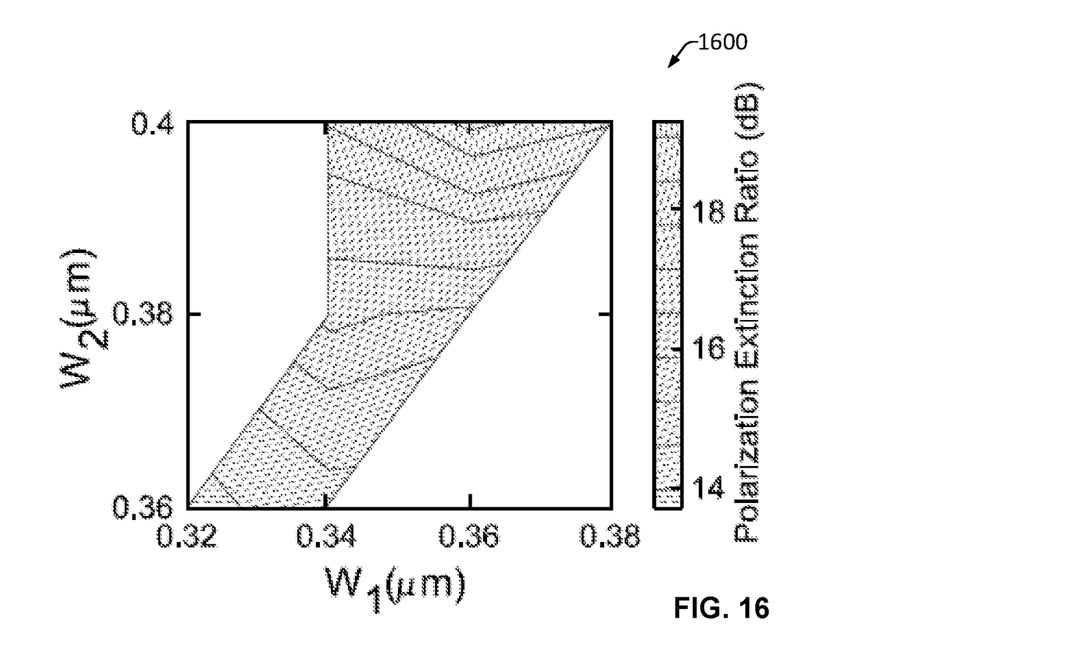
FIG. 16 illustrates PER measured for a through port incorporated into a PBS, according to an embodiment.

FIG. 15, contour map 1500, illustrates variation in PER (dB) measured at a through port (e.g., output 172) for width $W_1$ over a range of 0.36 to 0.4 µm versus width $W_2$ over a range of 0.32 to 0.38 µm, where G=0.8 µm and DL=400 µm. FIG. 16, contour map 1600, illustrates variation in PER (dB) measured at a cross port (e.g., output 174) for width $W_1$ over a range of 0.36 to 0.4 µm versus width $W_2$ over a range of 0.32 to 0.38 µm, where G=0.8 µm and DL=400 µm.

Per FIGS. 13-16, the through port (e.g., output 172) shows a lower PER when the gap G is wide and the coupling length along the DL is short, because TM mode is not yet sufficiently coupled from the through waveguide to the cross waveguide. When the gap G is narrow and the coupling length along DL is long, a small portion of TE mode can be coupled from the through waveguide into the cross waveguide, resulting in a lower PER measured at the through port. The PER of the cross port (e.g., output 174) is dependent on the TE mode coupled into the cross port. As shown, higher PER measurements were obtained from devices with a wide gap and a short coupling length than those with a narrower gap and a longer coupling length.

Further, as shown in FIGS. 15 and 16, the change in PER for a given variation in waveguide width, e.g., due to fabrication error, is within an acceptable range of about ±2 dB about a central value, e.g., a PER of about 10 dB to about 14 dB for through waveguide width variation between 0.36 to 0.4 μm (per FIG. 15) and a PER of about 14 dB to about 18 dB for cross waveguide width variation between 0.36 to 0.4 μm (per FIG. 15)

Figure 17:
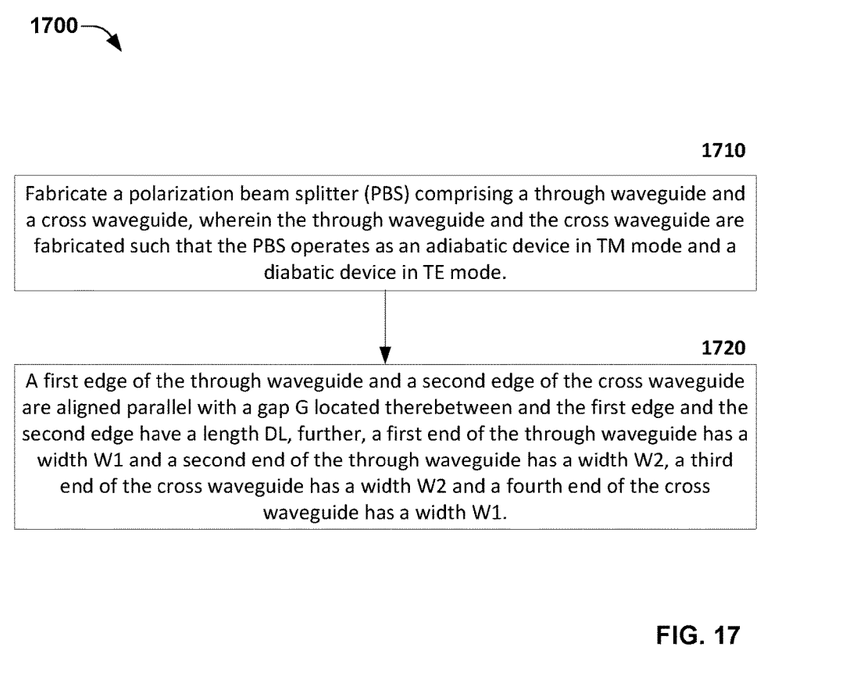
FIG. 17 is a flow diagram illustrating fabrication of a PBS, according to an embodiment.
Figure 18:
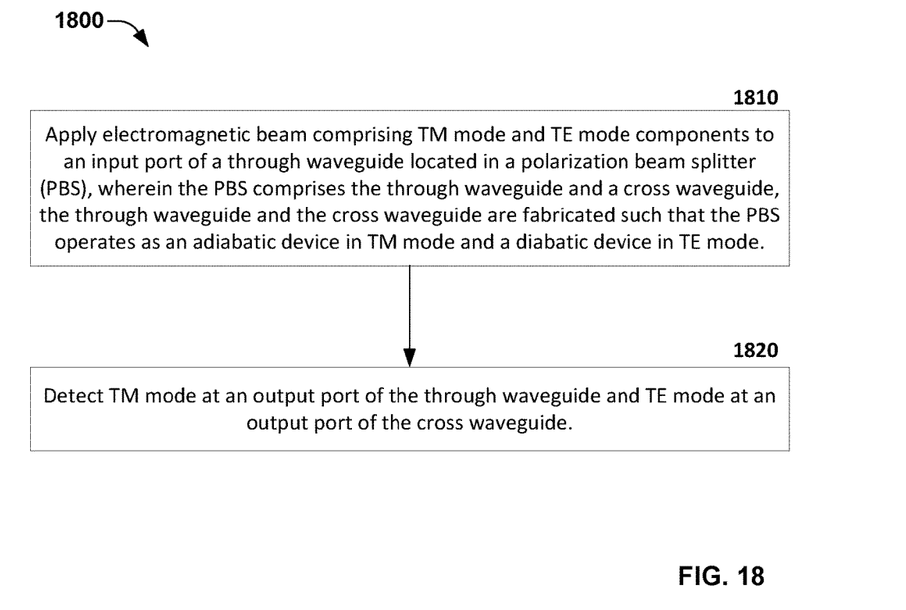
FIG. 18 is a flow diagram illustrating operation of a PBS, according to an embodiment.

FIGS. 17 and 18 illustrate exemplary methodologies relating to fabrication and operation of a PBS, wherein the PBS operates as an adiabatic device for TM mode and as a diabatic device for TE. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 17 illustrates an exemplary methodology 1700 relating to fabrication of a PBS, wherein the PBS operates as an adiabatic device for TM mode and as a diabatic device for TE. At 1710, a PBS is fabricated, wherein the PBS comprises a through waveguide and a cross waveguide. The through waveguide and the cross waveguide are fabricated such that the PBS operates as an adiabatic device in TM mode and a diabatic device in TE mode.

At 1720, with regard to the fabrication, a first edge of the through waveguide and a second edge of the cross waveguide are aligned parallel with a gap G located therebetween, and further, the first edge and the second edge have a device length DL. Furthermore, a first end of the through waveguide has a width $W_1$ and a second end of the through waveguide has a width $W_2$, a third end of the cross waveguide has a width $W_2$ and a fourth end of the cross waveguide has a width $W_1$.

FIG. 18 illustrates an exemplary methodology 1800 relating to operation of a PBS, wherein the PBS operates as an adiabatic device for TM mode and as a diabatic device for TE. At 1810, an electromagnetic beam comprising TM mode and TE mode components is applied to an input port of a through waveguide located in a polarization beam splitter (PBS) wherein the PBS comprises the through waveguide and a cross waveguide, as previously described. The through waveguide and the cross waveguide are fabricated such that the PBS operates as an adiabatic device in TM mode and a diabatic device in TE mode.

At 1820, a TM mode is detected at an output port connected to the second end of the through waveguide and TE mode is detected at an output port connected to the fourth end of the cross waveguide.

The various embodiments presented herein can find application in any suitable device or operation requiring polarization beam splitting, such as in a quantum circuit. Further, while the various embodiments herein are presented with the electromagnetic beam comprising the TE mode component 150 and TM mode component 160 being input into the PBS 100 at input port 170, the electromagnetic beam can be applied to any of the ports 172, 174 or 176.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A polarization beam splitter (PBS) comprising:
a through waveguide configured to operate as a transverse electric (TE) mode adiabatic waveguide, wherein the through waveguide has a first end and a second end; and
a cross waveguide configured to operate as a transverse magnetic (TM) mode diabatic waveguide, the cross waveguide has a third end and a fourth end, wherein the through waveguide and the cross waveguide are separated by a gap and are aligned substantially parallel on either side of the gap, wherein the first end is located opposite the third end, the second end is located opposite the fourth end, the first end and the fourth end have a first width and the second end and the third end have a second width, the first width and the second width are different.

2. The PBS of claim 1, the through waveguide further comprising an input port, wherein an optical beam comprising both TE mode and TM mode components is applied to the input port of the through waveguide.

3. The PBS of claim 2, the through waveguide further comprising an output port, wherein the TE mode component of the optical beam exits the PBS via the output port of the through waveguide.

4. The PBS of claim 2, the cross waveguide further comprising an input port and an output port, wherein the TM mode component of the optical beam exits the PBS via the output port of the cross waveguide.

5. The PBS of claim 2, wherein the optical beam has a wavelength in the range of 1500 nanometers (nm) to 1600 nm.

6. The PBS of claim 1, wherein the gap has a width in the range of 0.7 nm to 0.9 nm.

7. The PBS of claim 1, wherein the through waveguide and the cross waveguide have a length in the range of 300 nm to 1000 nm.

8. The PBS of claim 1, wherein the first width has a value in the range of 0.36 nm to 0.40 nm.

9. The PBS of claim 1, wherein the second width has a value in the range of 0.32 nm to 0.38 nm.

10. The PBS of claim 1, wherein the through waveguide tapers up from the first end to the second end, and the cross waveguide tapers down from the third end to the fourth end.

11. The PBS of claim 1, wherein the through waveguide has a first inner edge and the cross waveguide has a second inner edge, the first inner edge is located opposite to the second inner edge with the gap located between the first inner edge and the second inner edge.

12. A method for separating components in an electromagnetic beam, the method comprising:
applying an electromagnetic beam to a through waveguide, wherein the electromagnetic beam comprises a transverse electric (TE) component and a transverse magnetic (TM) component, the through waveguide is included in a polarization beam splitter (PBS), the PBS further includes a cross waveguide separated from the through waveguide by a crossover region, wherein:

the through waveguide is configured to facilitate propagation of the TE component along the entirety of the through waveguide, the through waveguide has a first end and a second end; and the cross waveguide is configured to facilitate crossover of the TM component from the through waveguide to the cross waveguide, the through waveguide and the cross waveguide are aligned to be parallel to each other on either side of the crossover region, the cross waveguide has a third end and a fourth end, wherein the first end is located opposite the third end, and the second end is located opposite the fourth end, the first end and the fourth end have a same first width, the second end and the third end have a same second width, the first width and the second width are different.

13. The method of claim 12, wherein the first width has a value in the range of 0.36 nm to 0.4 nm.

14. The method of claim 12, wherein the second width has a value in the range of 0.32 nm to 0.38 nm.

15. The method of claim 12, wherein the electromagnetic beam has a wavelength in the range of 1500 nanometers (nm) to 1600 nm.

16. The method of claim 12, wherein the crossover region has a width in the range of 0.7 nm to 0.9 nm.

17. The method of claim 12, wherein the through waveguide has a first inner edge and the cross waveguide has a second inner edge, the first inner edge is located opposite to the second inner edge with the crossover region located between the first inner edge and the second inner edge, the through waveguide and the cross waveguide have a common length, and the crossover region has a crossover length, wherein the common length of the through waveguide and the cross waveguide extend the length of the crossover length.

18. A polarization beam splitter (PBS) comprising:

a through waveguide configured to operate as a transverse electric (TE) mode adiabatic waveguide; and a cross waveguide configured to operate as a transverse magnetic (TM) mode diabatic waveguide, wherein the through waveguide and the cross waveguide are separated by a gap and the through waveguide and the cross waveguide are aligned parallel to each other on either side of the gap, wherein the through waveguide has a first end and a second end, the cross waveguide has a third end and a fourth end, the first end is located opposite the third end, and the second end is located opposite the fourth end, the first end and fourth end have a first width, the second end and the third end have a second width, wherein the first width and the second width are different, and the through waveguide has a width that tapers up from the first end to the second end and the cross waveguide has a width that tapers down from the third end to the fourth end.

19. The PBS of claim 18, the through waveguide further comprising an input port and an output port, and the cross waveguide has an output port, wherein an optical beam comprising both TE mode and TM mode components is applied to the input port of the through waveguide, the TE mode component of the optical beam exits the PBS via the through waveguide output port and the TM mode component of the optical beam exits the PBS via the cross waveguide output port.

20. The PBS of claim 18, wherein the through waveguide and the cross waveguide have a length configured such that the length is greater than a coupling strength between the through waveguide and the cross waveguide.

* * * * *